United States Patent
Price et al.

(10) Patent No.: US 7,337,445 B1
(45) Date of Patent: Feb. 26, 2008

(54) VIRTUAL SYSTEM CONSOLE FOR VIRTUAL APPLICATION ENVIRONMENT

(75) Inventors: Daniel B. Price, Mountain View, CA (US); Andrew G. Tucker, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 760 days.

(21) Appl. No.: 10/767,003

(22) Filed: Jan. 28, 2004

Related U.S. Application Data

(60) Provisional application No. 60/469,558, filed on May 9, 2003.

(51) Int. Cl.
- G06F 3/00 (2006.01)
- G06F 9/44 (2006.01)
- G06F 9/46 (2006.01)
- G06F 13/00 (2006.01)

(52) U.S. Cl. .......................... 719/313; 718/1; 719/319
(58) Field of Classification Search ................ 718/1, 718/100–107; 719/30–320, 382–330
See application file for complete search history.

(56) References Cited

U.S. PATENT DOCUMENTS

| | | |
|---|---|---|
| 5,155,809 A | 10/1992 | Baker et al. |
| 5,283,868 A | 2/1994 | Baker et al. |
| 5,291,597 A | 3/1994 | Shorter et al. |
| 5,325,517 A | 6/1994 | Baker et al. |
| 5,325,526 A | 6/1994 | Cameron et al. |
| 5,437,032 A | 7/1995 | Wolf et al. |
| 5,590,314 A * | 12/1996 | Ueno et al. .............. 719/321 |
| 5,784,706 A | 7/1998 | Oberlin et al. |

(Continued)

FOREIGN PATENT DOCUMENTS

EP 389151 A2 9/1990

(Continued)

OTHER PUBLICATIONS

Thompson, UNIX Implementation, The Bell System Technical Journal, 1978, pp. 1-9.*

(Continued)

*Primary Examiner*—William Thomson
*Assistant Examiner*—Diem K Cao
(74) *Attorney, Agent, or Firm*—Hickman, Palermo, Truong & Becker LLP; Christian A. Nicholes

(57) ABSTRACT

A mechanism is disclosed for establishing a separate virtual system console for each non-global zone of an operating system environment that has been partitioned into a global zone and one or more non-global zones. An operating system kernel instance implements a virtual console driver. A particular instance of the virtual console driver is executed. A device node is established within a non-global zone controlled by the kernel instance. An association is established between the device node and the particular virtual console driver instance. A process executes within the device node's non-global zone. In response to the process' request to write to the device node, it is determined which virtual console driver instance is associated with the device node. In response to determining that the device node is associated with the particular virtual console driver instance, data received from the process is sent to the particular virtual console driver instance.

27 Claims, 6 Drawing Sheets

U.S. PATENT DOCUMENTS

| | | | |
|---|---|---|---|
| 5,841,869 | A | 11/1998 | Merkling et al. |
| 5,845,116 | A | 12/1998 | Saito et al. |
| 6,064,811 | A | 5/2000 | Spilo et al. |
| 6,074,427 | A | 6/2000 | Fought et al. |
| 6,075,938 | A | 6/2000 | Bugnion et al. |
| 6,279,046 | B1 | 8/2001 | Armstrong et al. |
| 6,289,462 | B1 | 9/2001 | McNabb et al. |
| 6,557,168 | B1 | 4/2003 | Czajkowski |
| 6,633,963 | B1 | 10/2003 | Ellison et al. |
| 6,681,238 | B1 * | 1/2004 | Brice et al. .................... 718/1 |
| 6,681,258 | B1 | 1/2004 | Ratcliff et al. |
| 6,701,460 | B1 | 3/2004 | Suwandi et al. |
| 6,738,832 | B2 | 5/2004 | Burr et al. |
| 6,813,766 | B2 | 11/2004 | Hay |
| 6,944,699 | B1 * | 9/2005 | Bugnion et al. ............ 710/269 |
| 6,961,941 | B1 | 11/2005 | Nelson et al. |
| 7,051,340 | B2 | 5/2006 | Fisher et al. |
| 7,076,634 | B2 | 7/2006 | Lambeth et al. |
| 7,095,738 | B1 | 8/2006 | Desanti |
| 7,188,120 | B1 | 3/2007 | Leonard et al. |
| 2002/0069369 | A1 | 6/2002 | Tremain |
| 2002/0120660 | A1 | 8/2002 | Hay et al. |
| 2002/0156824 | A1 | 10/2002 | Armstrong et al. |
| 2002/0161817 | A1 | 10/2002 | Dorofeev et al. |
| 2002/0174215 | A1 | 11/2002 | Schaefer |
| 2003/0014466 | A1 | 1/2003 | Berger et al. |
| 2003/0069939 | A1 | 4/2003 | Russell |
| 2004/0010624 | A1 | 1/2004 | Garofalo et al. |
| 2004/0162914 | A1 | 8/2004 | St. Pierre et al. |
| 2004/0215848 | A1 | 10/2004 | Craddock et al. |

FOREIGN PATENT DOCUMENTS

| | | | |
|---|---|---|---|
| EP | | 1043658 A1 | 10/2000 |
| EP | | 1228038 A2 | 2/2003 |
| EP | | 1300766 A | 4/2003 |
| WO | WO 00/45262 A2 | | 8/2000 |

OTHER PUBLICATIONS

Kamp, Rethinking /dev and devices in the UNIX kernel, BSDCon 2002 Paper, Feb. 13, 2002, pp. 1-18.*

Hope, Using Jails in freeBSD for fun and profit, ;login:The magazine of Usenix and Sage, vol. 27, Jun. 2002, pp. 48-55.*

Hewlett-Packard, Installing and Managing HP-UX Virtual Partitions (vPars), Third edition, Nov. 2002, pp. 17-44, 72-75, 157-161.*

Offical Action from EPO for foreign patent application No. 04 252 690.5 —2211 dated Nov. 23, 2005 (5 pgs) —attached.

Current Claims in EPO patent application No. 04 252 690.5—2211 (9 pgs) —attached.

European Patent Office, "European Search Report," application No. 04252689.7, mailing date Jul. 28, 2005, 3 pages.

Current Claims, European patent application 04252689.7, 6 pages.

Sun Microsystems, "Sun Enterprise™ 1000 Server: Dynamic System Domains," White Paper Online, Feb. 26, 2003, retrieved from the internet at <http:www.sun.com/servers/highend/whitepapers/domains.html?facet= -1>, retrieved on Jun. 21, 2005, XP-002332946, 7 pages.

Offical Action from EPO for foreign patent application No. 04 252 690.5—2211 dated Jun. 10, 2005 (6 pgs) —attached.

European Search Report from the European Patent Office for Foreign Patent Application No. 04252690.5 (3 pgs.).

Claims As Filed in European Patent Application No. 04252690.5 (6 pgs.).

Poul-Henning Kamp, et al., "Jails: Confining the omnipotent root", 2nd Intl System Administration and Networking Conference Proceedings "SANE 2000", May 22-25, 2000, Maastricht, The Netherlands, pp. 1-11.

Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).

Sun Microsystems, Inc. entitled Server Virtualization with Trusted Solaris™ 8 Operating Environment, by Glenn Faden, Sun Blue Prints™ OnLine—Feb. 2002, http://www.sun.com/blueprints, (21 pgs).

Network Working Group entitled "IP Version 6 Addressing Architecture", by R. hinden, Nokia, S. Deering, Cisco System, dtd Jul. 1998, (28 pgs).

IBM entitled Partitioning for the IBM eserver pSeries 690 System, © Copyright IBM Corp. 2001 (12 pgs).

IBM System Partitioning on IBM eserver xSeries Servers entitled "Effective Server Consolidation and Resource Management with System Partitioning" by Mark T. Chapman, IBM Server Group, dtd Dec. 2001, (23 pgs).

Virtual Private Servers and Security Contexts, dtd May 10, 2004, http://www.solucorp.qc.ca/miscprj/s_content.hc?prjstate=1 &nodoc=0, (2 pgs).

SunSoft, a Sun Microsystems, Inc. Business entitled "File System Administration", © 1994 Sun Microsystems, Inc., (62 pgs).

Czajkowski; G., "Application isolation in the Java Virtual Machine", 2000, ACM Press, Proceedings of the 15th ACM SIGPLAN Conference on Object-Oriented Programming, Systems, Languages, and Applications, pp. 354-366.

Czajkowski, G., "Multitasking without compromise: a virtual machine evolution", ACM Press, Proceedings of the 16th ACM SIGPLAN Conference on Object Oriented Programming, Systems, Languages, and Applications, dated Oct. 2001, pp. 125-138.

Osman, S., et al., "The design and implementation of Zap: a system for migrating computing environments", SIGOPS Operating System, Rev. 36, SI, dated Dec. 2000, pp. 361-376.

Presotto et al., "Interprocess Communication in the Ninth Edition Unix System", John Wiley & Sons, Ltd., dated Mar. 1990, 4 pages.

Stevens, "Advanced programming in the Unix Environment", Addison-Wesley, 1993, pp. 427-436.

Watson, "TrustedBSD—Adding Trusted Operating System Features to FreeBSD", The USENIX Association, 2001, 14 pages.

Noordende et al., "Secure and Portable Confinement of Untrusted Programs", ACM, 2002, 14 pages.

Hope, "Using Jails in FreeBSD for fun and profit", ;Login: The Magazine of USENIX &SAGE, vol. 27, No. 3, dated Jun. 2002, pages 48-55.

* cited by examiner

VIRTUAL SYSTEM CONSOLE FOR VIRTUAL APPLICATION ENVIRONMENT

CLAIM OF PRIORITY

This application claims priority to U.S. Provisional Application Ser. No. 60/469,558, filed May 9, 2003, entitled "OPERATING SYSTEM VIRTUALIZATION," by Andrew G. Tucker, et al., the entire contents of which are incorporated by reference as if fully set forth herein.

BACKGROUND

Many of today's computing systems include computing resources that are not fully utilized. The owners of these systems often could benefit by increasing the utilization of these systems' computing resources.

A number of approaches could be adopted in order to increase utilization. Under a "consolidation" approach, the processes and data of multiple parties might be co-located on a single hardware unit in order to more fully utilize the resources of the hardware unit. Under the consolidation approach, multiple parties might share a single hardware unit's resources, including file systems, network connections, and memory structures. For example, multiple businesses might have separate websites that are hosted by the same server.

However, some of the parties might not know or trust each other. In some cases, some of the parties actually might be competitors with others of the parties. Under such circumstances, each party would want to ensure that its processes and data were shielded, or isolated, from access by other parties and those other parties' processes.

Mechanisms that would isolate one party's processes and data from other parties sharing the same hardware unit have been proposed. For example, a "jail" mechanism provides the ability to partition an operating system into a "non-jailed" environment and one or more "jailed" environments. The jail mechanism allows users, processes, and data to be associated with a jailed environment. For example, one group of users, processes, and data may be associated with one jailed environment, and another group of users, processes, and data may be associated with another jailed environment. The jail mechanism restricts users and processes that are associated with a particular jailed environment from accessing processes and data that are associated with environments (both jailed and non-jailed) other than the particular jailed environment.

Some operating systems provide a system console. A system console may be viewed as a special terminal that is used primarily for system administration. A system administrator can use a system console to log-in to an operating system even when other log-in mechanisms are unavailable. Crucial system messages may be emitted through the system console. The system console is usually available before other system devices. For example, the system console may become available before system networking facilities become available, and the system console may remain available even if the system networking facilities become unavailable. In some operating systems, the system console is accessible through a keyboard and monitor attached to the computing system on which the operating system resides. In some operating systems, the system console is accessible through a serial port of the computing system on which the operating system resides.

In some operating systems, processes may write to a system console through a console device. The console device is a virtual, or "pseudo" device. In many operating systems, processes may read from and write to the console device as though the console device was a file. This "file" may be associated with a widely known and accepted filename and path within a file system, so that multiple different programs may be coded to read from and write to the same "file" when reading from and writing to the system console. Many existing programs have been coded to read from and write to the widely known and accepted "/dev/console" console device.

As discussed above, an operating system may be partitioned into a non-jailed environment and one or more jailed environments. When an operating system is so partitioned, some levels of the "global" file system may, for reasons described above, intentionally be made unavailable to one or more of the jailed environments. If the "/dev" directory is in a level of the global file system that is not available to the jailed environments, then processes executing in those jailed environments are prevented from reading from or writing to "/dev/console." As a result, when a process that is associated with a jailed environment attempts to read from or write to the system console, the attempt is unsuccessful.

Consequently, some existing programs that would execute normally in a non-partitioned operating system may malfunction or fail when executed in a partitioned operating system.

SUMMARY

In accordance with one embodiment of the present invention, a mechanism is disclosed for establishing a separate virtual system console for at least one non-global "zone" of an operating system instance that has been partitioned into a global "zone" and one or more non-global "zones". Although not identical to the jailed environments described above, non-global zones possess some characteristics that are like those possessed by jailed environments. A global zone's file system may be "partitioned" so that a selected directory in the global zone's file system appears, to a non-global zone, to be the non-global zone's root directory. Global and non-global zones are described in greater detail following this summary.

The operating system's kernel instance implements a virtual console driver. For each non-global zone for which a virtual console device is desired, a particular instance of the virtual console driver is executed.

In accordance with one embodiment, multiple device nodes are established in a manner described below. By way of explanation of the following description, some operating systems represent devices as special files in a file system.

A first device node is established within a non-global zone by the operating system's device management software. The first device node is a special file that possesses the same properties as the well-known special file that usually represents the system console in non-partitioned operating systems. As is described in greater detail below, the first device node may be made available at a location in a global file system hierarchy such that the first device node appears, to processes executing within the non-global zone, to be located at an expected location in a portion of the global file system that is exposed to the non-global zone as the non-global zone's file system. To such processes, the first device node appears to be no different than the "normal" operating system console present in many non-partitioned operating systems. An association is established between the first device node and the particular virtual console driver instance.

A second device node is established within the global zone by the operating system's device management software. An association is established between the second device node and the particular virtual console driver instance. The second device node is not made available to processes executing within the non-global zone.

The embodiment described above may be used as a bi-directional communication channel that bridges the global zone and the non-global zone. Due in part to both the first and second device nodes being associated with the same virtual console driver instance, processes executing in the non-global zone may read from the first device node in order to obtain data written to the second device node by processes executing in the global zone. Conversely, processes executing in the global zone may read from the second device node in order to obtain data written to the first device node by processes executing in the non-global zone.

DETAILED DESCRIPTION OF EMBODIMENT(S)

Overview

Figure 1:
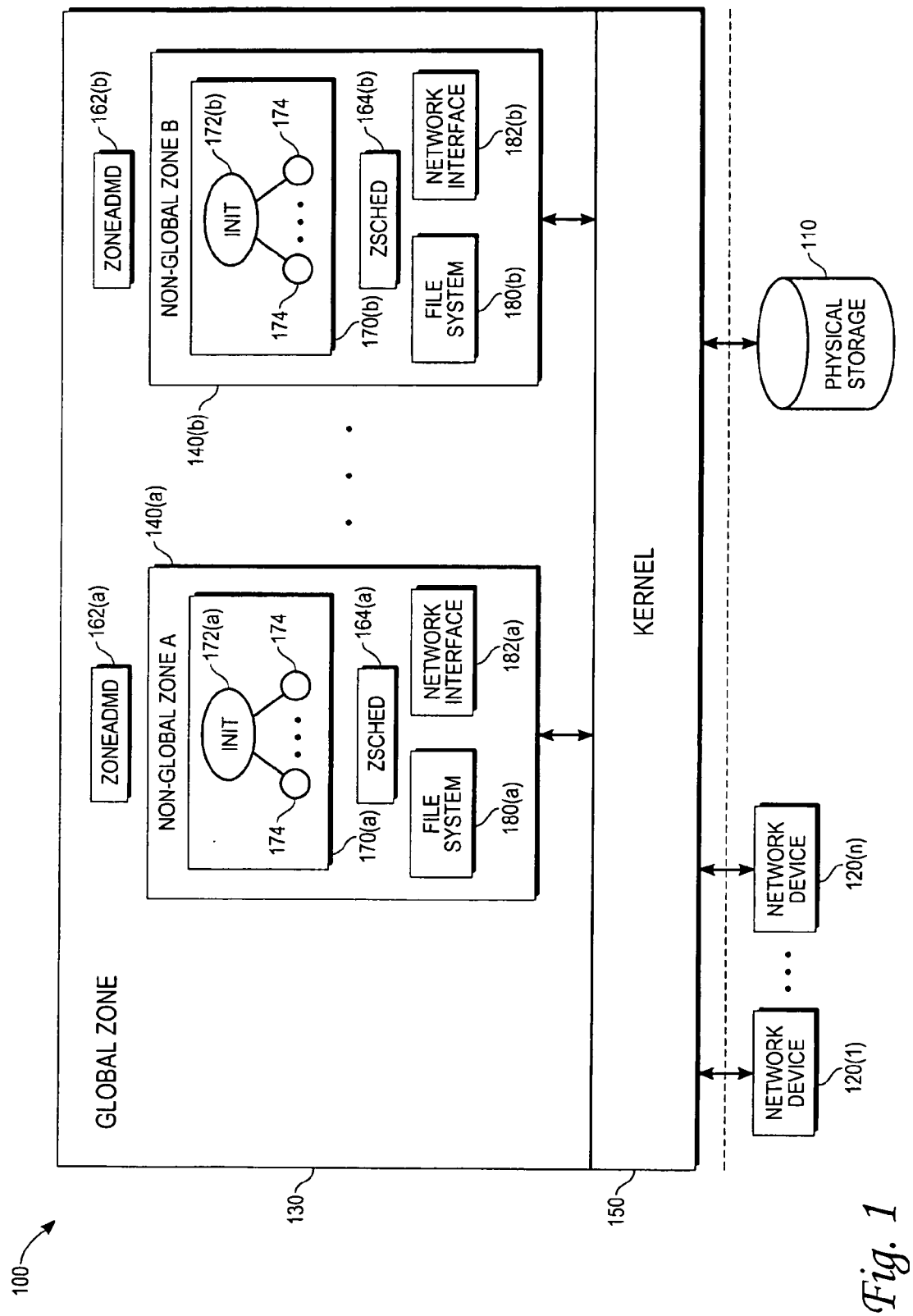
FIG. 1 is a functional block diagram of a representative operating system (OS) for a computing system in which one embodiment of the present invention may be implemented.
Figure 5:
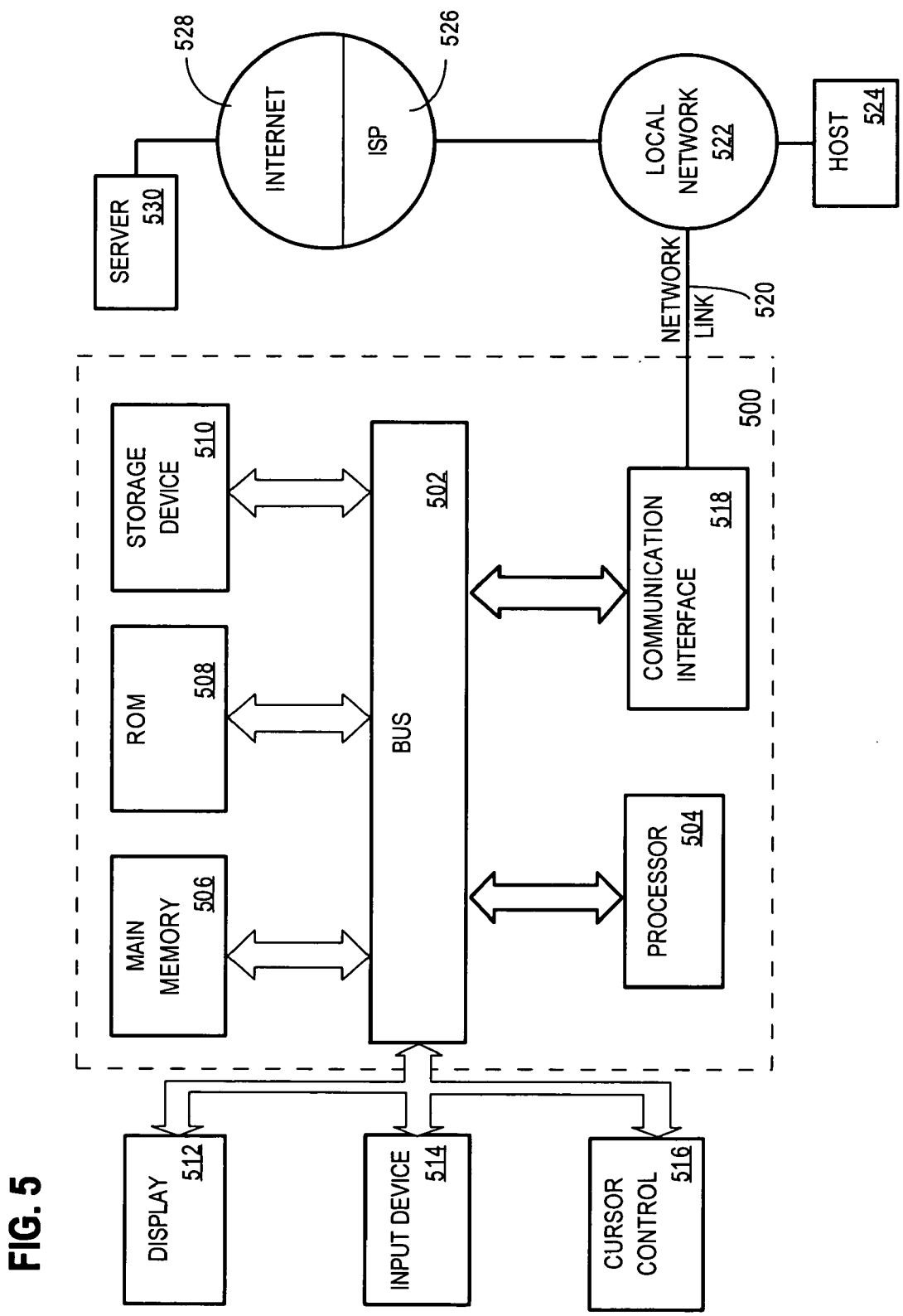
FIG. 5 is a hardware block diagram of a sample computer system, upon which one or more components of an embodiment of the present invention may be implemented.

FIG. 1 illustrates a functional block diagram of an operating system (OS) 100 in accordance with one embodiment of the present invention. OS 100 may be derived by executing one or more OS programs in a general-purpose computer system, such as computer system 500 illustrated in FIG. 5, for example. Although FIG. 5 depicts a system that contains centralized component resources, embodiments may be implemented on systems that comprise remotely distributed component resources (e.g., processors, memory, persistent storage, etc.) that access each other via a network. For illustrative purposes, the OS is assumed to be Solaris™ manufactured by Sun Microsystems, Inc. of Santa Clara, Calif. However, the concepts taught herein may be applied to any OS, including but not limited to Unix, Linux, Microsoft Windows, MacOS, etc.

As shown in FIG. 1, OS 100 may comprise one or more zones (also referred to herein as partitions), including a global zone 130 and zero or more non-global zones 140. The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS 100. One of the purposes of the non-global zones 140 is to provide isolation. In one embodiment, a non-global zone 140 can be used to isolate a number of entities, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system 180 of another zone, nor can they access or affect the network interface 182 of another zone. As a result, the processes 170 in a non-global zone 140 are limited to accessing and affecting the processes and entities in that zone. Isolated in this manner, each non-global zone 140 behaves like a virtual standalone computer. Thus, each non-global zone 140 may be referred to as a separate virtual OS environment (VOSE). In the discussion below, "non-global zone" and "VOSE" are used interchangeably. While processes 170 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many applications. For example, if a single computer system running a single instance of an OS is to be used to host applications for different competitors (e.g., competing websites), then it would be desirable to isolate the data and processes of one competitor from the data and processes of another competitor. That way, it can be ensured that information will not be leaked between the competitors. Partitioning OS 100 into non-global zones 140 and hosting the applications of the competitors in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 generally are not allowed to access or control any of the physical devices of the computer system.

In contrast to a non-global zone administrator, a global zone administrator with proper rights and privileges may administer all aspects of the OS 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, kernel 150 enforces the zone boundaries. More specifically, kernel 150 ensures that processes 170 in one non-global zone 140 are not able to access or affect processes 170, file systems 180, and network interfaces 182 of another zone (non-global or global). In addition to enforcing the zone boundaries, kernel 150 also provides a number of other services. These services include but are not limited to mapping the network interfaces 182 of the non-global zones 140 to the physical network devices 120 of the computer system, and mapping the file systems 180 of the non-global zones 140 to an overall file system and a physical storage 110 of the computer system.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1 m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of one or more file systems to be mounted when the zone is created, specification of zero or more network interfaces, specification of devices to be configured when the zone is created, and zero or more resource pool associations.

Once a zone is in the Configured state, a global administrator may invoke another operating system utility (in one embodiment, zoneadm(1 m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1 m) again), which a zoneadmd process 162 causes to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In creating a non-global zone 140, a number of operations are performed, including but not limited to assigning a zone ID, starting a zsched process 164 (zsched is a kernel process; however, it runs within the non-global zone 140, and is used to track kernel resources associated with the non-global zone 140), mounting file systems 180, plumbing network interfaces 182, configuring devices, and setting resource controls. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer. When a non-global zone 140 is in the Ready state, no user or non-kernel processes are executing inside the zone (as is mentioned above, zsched is a kernel process, not a user process). Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a non-global zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Functional Overview

Figure 2:
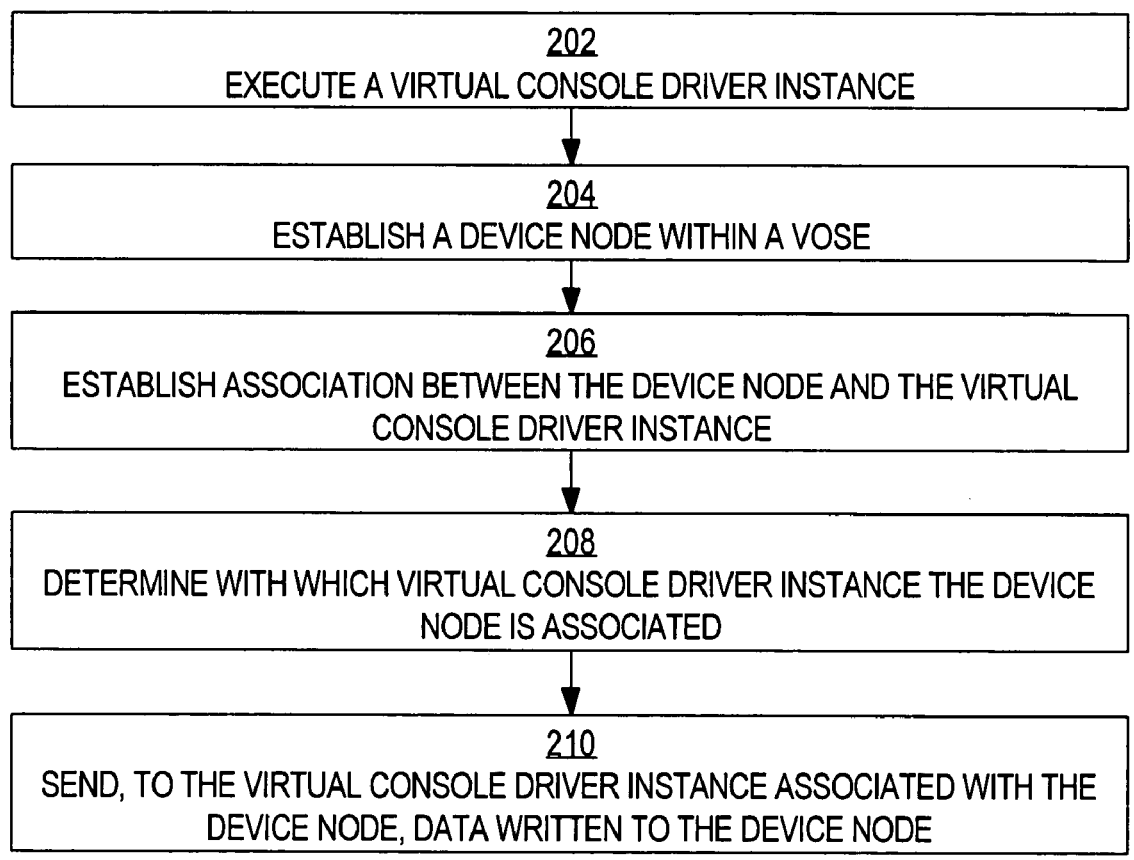
FIG. 2 depicts an overview of an operational flow for establishing a virtual system console in a non-global zone of an OS that has been partitioned into a global zone and one or more non-global zones, in accordance with one embodiment of the present invention.

FIG. 2 depicts an overview of an operational flow for establishing a virtual system console in a non-global zone of an OS that has been partitioned into a global zone and one or more non-global zones, in accordance with one embodiment of the present invention. In block 202, a particular instance of a virtual console driver, which is implemented by an operating system kernel instance, is executed. In block 204, a device node is established within a particular virtual OS environment (VOSE) (e.g., non-global zone) of a plurality of VOSEs controlled by the operating system kernel instance. In block 206, an association is established between the device node and the particular instance of the virtual console driver.

A process executes in the particular VOSE. In block 208, in response to the process' request to write to the device node, it is determined with which instance of the virtual console driver the device node is associated. In block 210, in response to determining that the device node is associated with the particular instance of the virtual console driver, data received from the process is sent to the particular instance of the virtual console driver.

Thus, processes executing in the particular VOSE may write to a virtual system console. Processes executing in the global zone may similarly write to the system console. To facilitate this, a device node is established in the global zone. An association is established between the device node and the particular instance of the virtual console driver that was executed in block 202. In response to a global zone process' request to write to the global zone's device node, data received from the process is sent to the particular instance of the virtual console driver. Consequently, processes executing in the particular VOSE may read the data by reading from the device node established in the particular VOSE and associated with the particular instance of the virtual console driver.

Virtual System Consoles

In one embodiment, a separate virtual system console is provided for each non-global zone 140. Processes executing within a particular non-global zone can read from and write to the virtual system console for that particular non-global zone in the same manner that those processes could read from and write to a system console in a non-partitioned OS environment. As a result, programs that contain code to read from and write to a system console do not need to be modified in order to execute normally in a non-global zone. In one embodiment, a virtual system console for a particular non-global zone is associated with a device node (e.g., a block special file or character special file) located at "/dev/console" in the particular non-global zone's file system.

Figure 3:
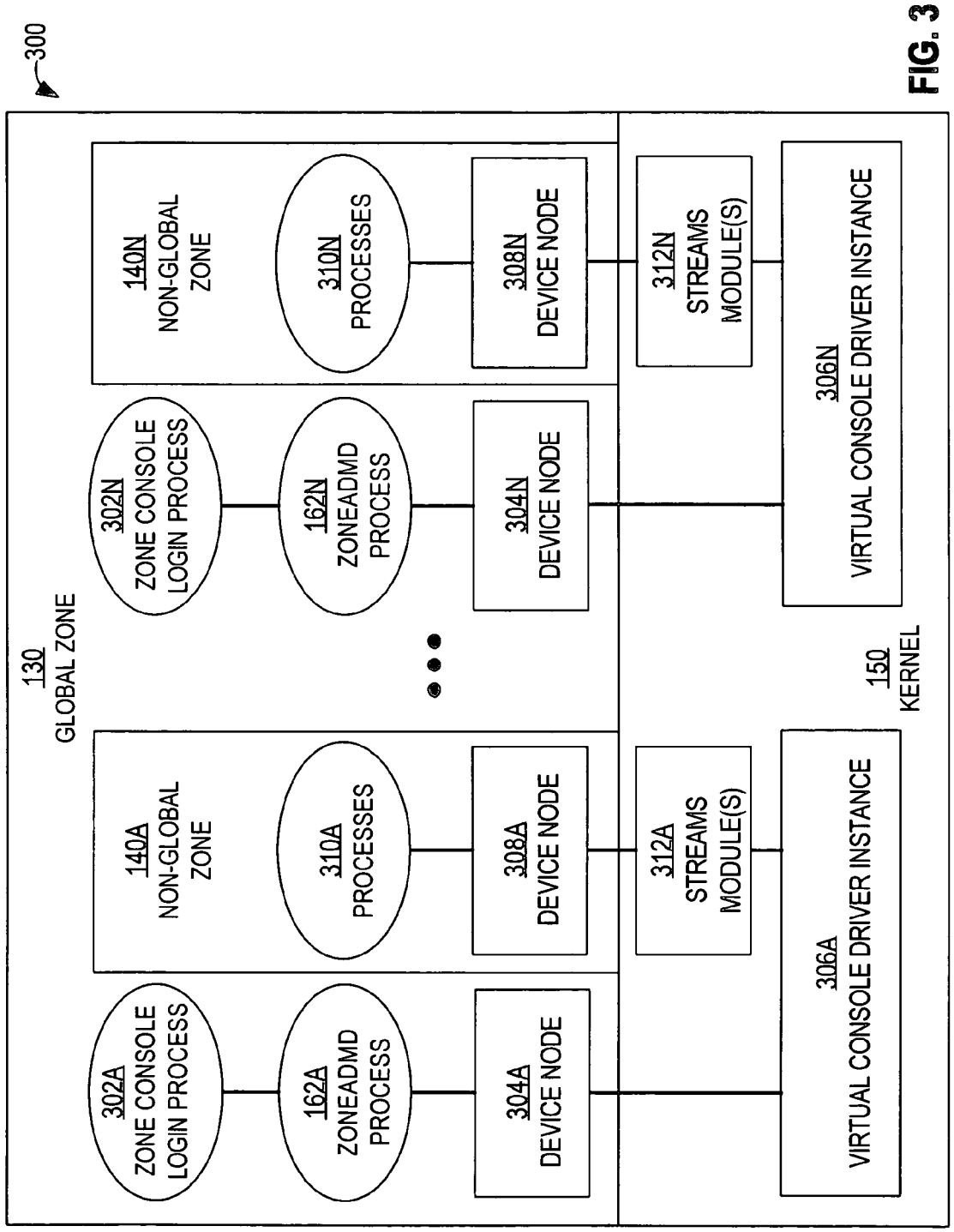
FIG. 3 illustrates a functional block diagram of a partitioned OS that provides a separate virtual system console in each partition thereof, in accordance with one embodiment of the present invention.

FIG. 3 illustrates a functional block diagram of a partitioned OS 300 that provides a separate virtual system console in each partition thereof, in accordance with one embodiment of the present invention. OS 300 includes global zone 130, which includes one or more non-global zones 140. Global zone 130 is a global OS environment, while each of non-global zones 140 is a virtual OS environment (VOSE). Global zone 130 and non-global zones 140 are under the control of kernel 150.

One or more processes may execute in each of non-global zones 140. For example, processes 310a execute in non-global zone 140a, processes 310b execute in non-global zone 140b, and so on. Each of non-global zones 140a-n may include a separate device node via which processes executing in that non-global zone may read from and write to the virtual system console for that non-global zone. For example, non-global zone 140a includes device node 308a, non-global zone 140b includes device node 308b, and so on. Processes executing in non-global zone 140a read from and write to the virtual system console for non-global zone 140a via device node 308a, processes executing in non-global zone 140b read from and write to the virtual system console for non-global zone 140b via device node 308b, and so on.

One or more processes may execute in global zone 130. For example, zone console login processes 302 and zoneadmd processes 162 execute in global zone 130. Zone console login processes 302 may send data to and receive data from zoneadmd processes 162. For example, zone console login process 302a sends data to and receives data from zoneadmd process 162a, zone console login process 302b sends data to and receives data from zoneadmd process 162b, and so on. Each zone console login process may send data received from a zoneadmd process to a user terminal, and send data received from a user terminal to a zoneadmd process.

For each of non-global zones 140, global zone 130 includes a separate device node via which a zoneadmd process corresponding to that non-global zone reads from and writes to the virtual system console for that non-global zone. For example, global zone 130 includes device nodes 304. Zoneadmd process 162a reads from and writes to the virtual system console for non-global zone 140a via device node 304a, zoneadmd process 162b reads from and writes to the virtual system console for non-global zone 140b via device node 304b, and so on.

For each of non-global zones 140, kernel 150 includes a separate virtual console driver instance that relays data between a node device in global zone 130 and a node device in that non-global zone. For example, kernel 150 includes virtual console driver instances 306. Virtual console driver instance 306a relays data between device node 304a and device node 308a, virtual console driver interface 306b relays data between device node 304b and device node 308b, and so on. Because virtual console driver instances 306 are within kernel 150, virtual console driver instances 306 persist even when their corresponding non-global zones 140 fail, shut down, or reboot.

In one embodiment, each of virtual console driver instances 306 is attached to one or more STREAMS modules. For example, virtual console driver instance 306a is attached to STREAMS modules 312, virtual console driver instance is attached to STREAM modules 312b, and so on. Data passing between a non-global zone's device node and that non-global zone's corresponding virtual console driver instance passes through the virtual console driver instance's attached STREAMS modules.

As is described above, in configuring a global zone, a global zone administrator may specify a zone path to the root directory of the zone. Thus, the root directory of a non-global zone's file system may be a specified subdirectory within the global zone's file system. For example, a global zone administrator may specify that the root directory for file system 180a in non-global zone 140a is "/zones/zonea" in the global file system. In this case, to processes executing in non-global zone 140a, the "/zones/zonea" directory appears to be the root directory.

Therefore, in one embodiment, to allow processes executing within a non-global zone to access the widely known and accepted "/dev/console" console device, the zoneadmd process associated with a non-global zone instructs kernel 150 to create a device node "/dev/console" in that non-global zone's file system. For example, if the root directory for file system 180a is "/zones/zonea" in the global file system, then zoneadmd process 162a may instruct kernel 150 to create a first device node "/zones/zonea/dev/console" (e.g., device node 308a). Similarly, if the root directory for file system 180b is "/zones/zoneb" in the global file system, then zoneadmd process 162b may instruct kernel 150 to create a second device node "/zones/zoneb/dev/console" (e.g., device node 308b). To processes executing within non-global zone 140a, the first device node appears to be "/dev/console", and to processes executing within non-global zone 140b, the second device node also appears to be "/dev/console".

In one embodiment, each such device node is an interface to an instance of a virtual console driver contained in kernel 150. In generating a virtual system console for a non-global zone, that non-global zone's zoneadmd process may instruct kernel 150 to generate a new instance of the virtual console driver. In one embodiment, each such instance is associated with a major-minor number pair that is unique to that instance. For example, an instance's major number may indicate that the instance is an instance of the virtual console driver, and an instance's minor number may indicate the identity of the non-global zone with which the instance is associated.

In one embodiment, when a zoneadmd process instructs kernel 150 to generate an instance of the virtual console driver, kernel 150 generates an instance of the virtual console driver and indicates the instance's major-minor number pair to the zoneadmd process. To instruct kernel 150 to generate a device node for the virtual system console, the zoneadmd process may invoke a kernel command (e.g., "mknod") that specifies the major-minor number pair as parameters. In response to such an invocation, kernel 150 creates a new device node and associates the new device node with the major-minor number pair. As a result, when processes read data from the device node, kernel 150 causes the data to be read from the instance of the virtual console driver, and when processes write data to the device node, kernel 150 causes the data to be written to the instance of the virtual console driver.

For example, in order to create a virtual system console for non-global zone 140*a*, zoneadmd 162*a* may instruct kernel 150 to create a new instance of the virtual console driver. In response, kernel 150 may create a new instance of the virtual console driver (e.g., virtual console driver instance 306*a*) and identify the new instance's major-minor number pair as "33,1". Zoneadmd 162*a* may then invoke "mknod/zones/zonea/dev/console 33,1" to cause kernel 150 to create a new "/dev/console" device node (e.g., device node 308*a*) in file system 180*a*. Thereafter, the "/dev/console" device node in file system 180*a* acts as an interface to the virtual console driver instance associated with the major-minor number pair "33,1".

For another example, in order to create a virtual system console for non-global zone 140*b*, zoneadmd 162*b* may instruct kernel 150 to create a new instance of the virtual console driver. In response, kernel 150 may create a new instance of the virtual console driver (e.g., virtual console driver instance 306*b*) and identify the new instance's major-minor number pair as "33,2". Zoneadmd 162*b* may then invoke "mknod/zones/zoneb/dev/console 33,2" to cause kernel 150 to create a new "/dev/console" device node (e.g., device node 308*b*) in file system 180*b*. Thereafter, the "/dev/console" device node in file system 180*b* acts as an interface to the virtual console driver instance associated with the major-minor number pair "33,2".

In one embodiment, the virtual console driver is a relay mechanism that comprises a master interface and a slave interface. The virtual console driver is configured to receive data through the master interface and send that data through the slave interface. The virtual console driver is configured to receive data through the slave interface and send that data through the master interface. Thus, processes reading from the slave interface receive data written to the master interface, and processes reading data from the master interface receive data written to the slave interface. Each separate instance of the virtual console driver comprises a separate master interface and a separate slave interface.

In one embodiment, a virtual console driver instance's slave interface is mapped to the "/dev/console" device node of that instance's corresponding non-global zone, and that instance's master interface is mapped to a device node within global zone 130. Thus, in one embodiment, after a zoneadmd process instructs kernel 150 to create a new virtual console driver instance, the zoneadmd process may instruct kernel 150 to create a new device node in global zone 130 and map the new virtual console's master interface to the new device node.

For example, after kernel 150 has created a new instance of the virtual console driver (e.g., virtual console driver instance 306*a*) with major-minor pair "33,1", zoneadmd 162*a* may instruct kernel 150 to create a "/dev/console" device node (e.g., device node 308*a*) in non-global zone 140*a* and map that virtual console driver instance's slave interface to that device node. Additionally, zoneadmd 162*a* may instruct kernel 150 to create a "/dev/zones/zonea/console" device node (e.g., device node 304*a*) in global zone 130 and map the virtual console driver instance's master interface to that device node. As a result, processes executing in global zone 130 can read data from "/dev/zones/zonea/console" in order to read data that processes executing in non-global zone 140*a* have written to "/dev/console". Conversely, processes executing in non-global zone 140*a* can read data from "/dev/console" in order to read data that processes executing in global zone 130 have written to "/dev/zones/zonea/console". Processes executing in non-global zone 140*a* are prevented from accessing "/dev/zones/zonea/console" because that device node is not within non-global zone 140*a*.

For another example, after kernel 150 has created a new instance of the virtual console driver (e.g., virtual console driver instance 306*b*) with major-minor pair "33,2", zoneadmd 162*b* may instruct kernel 150 to create a "/dev/console" device node (e.g., device node 308*b*) in non-global zone 140*b* and map that virtual console driver instance's slave interface to that device node. Additionally, zoneadmd 162*b* may instruct kernel 150 to create a "/dev/zones/zoneb/console" device node (e.g., device node 304*b*) in global zone 130 and map the virtual console driver instance's master interface to that device node. As a result, processes executing in global zone 130 can read data from "/dev/zones/zoneb/console" in order to read data that processes executing in non-global zone 140*b* have written to "/dev/console". Conversely, processes executing in non-global zone 140*b* can read data from "/dev/console" in order to read data that processes executing in global zone 130 have written to "/dev/zones/zoneb/console". Processes executing in non-global zone 140*b* are prevented from accessing "/dev/zones/zoneb/console" because that device node is not within non-global zone 140*b*.

In one embodiment, each zoneadmd process 162 is configured to read from and write to the device node that is mapped to the master interface of the virtual console driver interface that is associated with that zoneadmd process' non-global zone. Thus, each zoneadmd process 162 reads data written to that zoneadmd process' non-global zone's virtual system console by processes executing in that zoneadmd process' non-global zone. Similarly, processes executing in a non-global zone may read data written to that non-global zone's virtual system console by that non-global zone's zoneadmd process 162.

In one embodiment, each zoneadmd process 162 is configured to receive data from and send data to other processes executing in global zone 130. Among such other processes may be one or more zone login, or "zlogin" processes (e.g., zone console login processes 302). Thus, zlogin processes may send data to and receive data from a non-global zone's virtual system console by sending data to and receiving data from the non-global zone's zoneadmd process 162.

In one embodiment, after a virtual console driver instance has been created for a non-global zone, the zoneadmd process for that zone instructs kernel 150 to perform one or more control operations relative to that instance. The control operations cause kernel 150 to attach one or more STREAMS modules (e.g., STREAMS modules 312) to the instance. The one or more STREAMS modules enable the instance to behave like a terminal. For example, STREAMS modules may include a terminal emulator module, a line discipline module, and a compatibility module. As a result, when processes in a non-global zone read data from "/dev/console", data written to the non-global zone's virtual console driver instance is appended and/or modified by each of the STREAMS modules before being received by the processes. Similarly, when processes in a non-global zone write data to "/dev/console", data written to the non-global zone's virtual console driver instance is appended and/or modified by each of the STREAMS modules before being received by the virtual console driver instance. In one embodiment, the terminal emulator module is anchored to the virtual console driver instance so that processes cannot delete the terminal emulator module.

Sample Operation

With the above information in mind, a sample of operation of the system 300 in accordance with one embodiment of the present invention will now be described. In the following discussion, reference will be made to the system diagrams of FIGS. 1 and 3 and the flow diagram of FIGS. 4A and 4B.

Figure 4A:
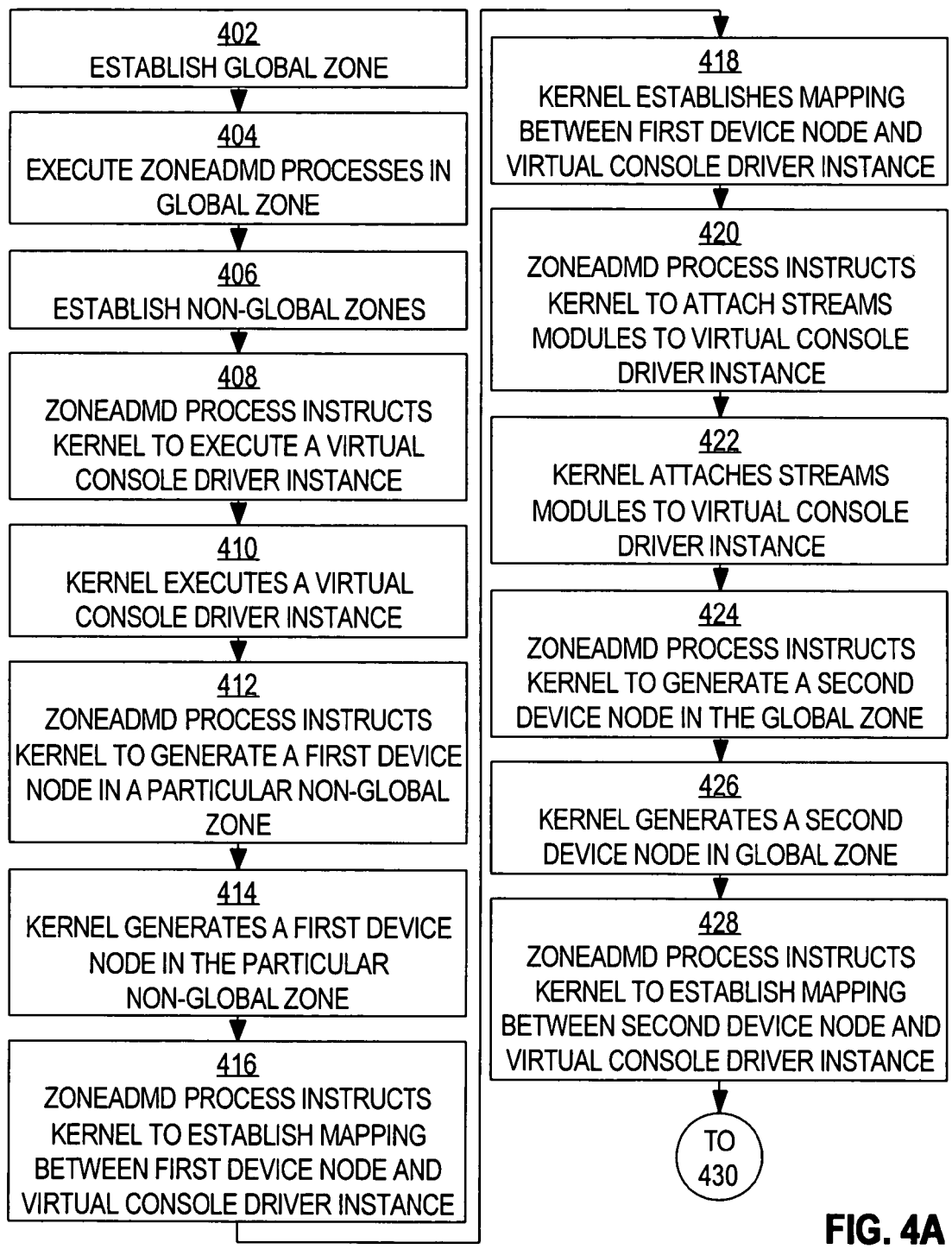
FIGS. 4A and 4B depict an operational flow for establishing a virtual system console in a non-global zone of an operating system that has been partitioned into a global zone and one or more non-global zones, in accordance with one embodiment of the present invention.
Figure 4B:
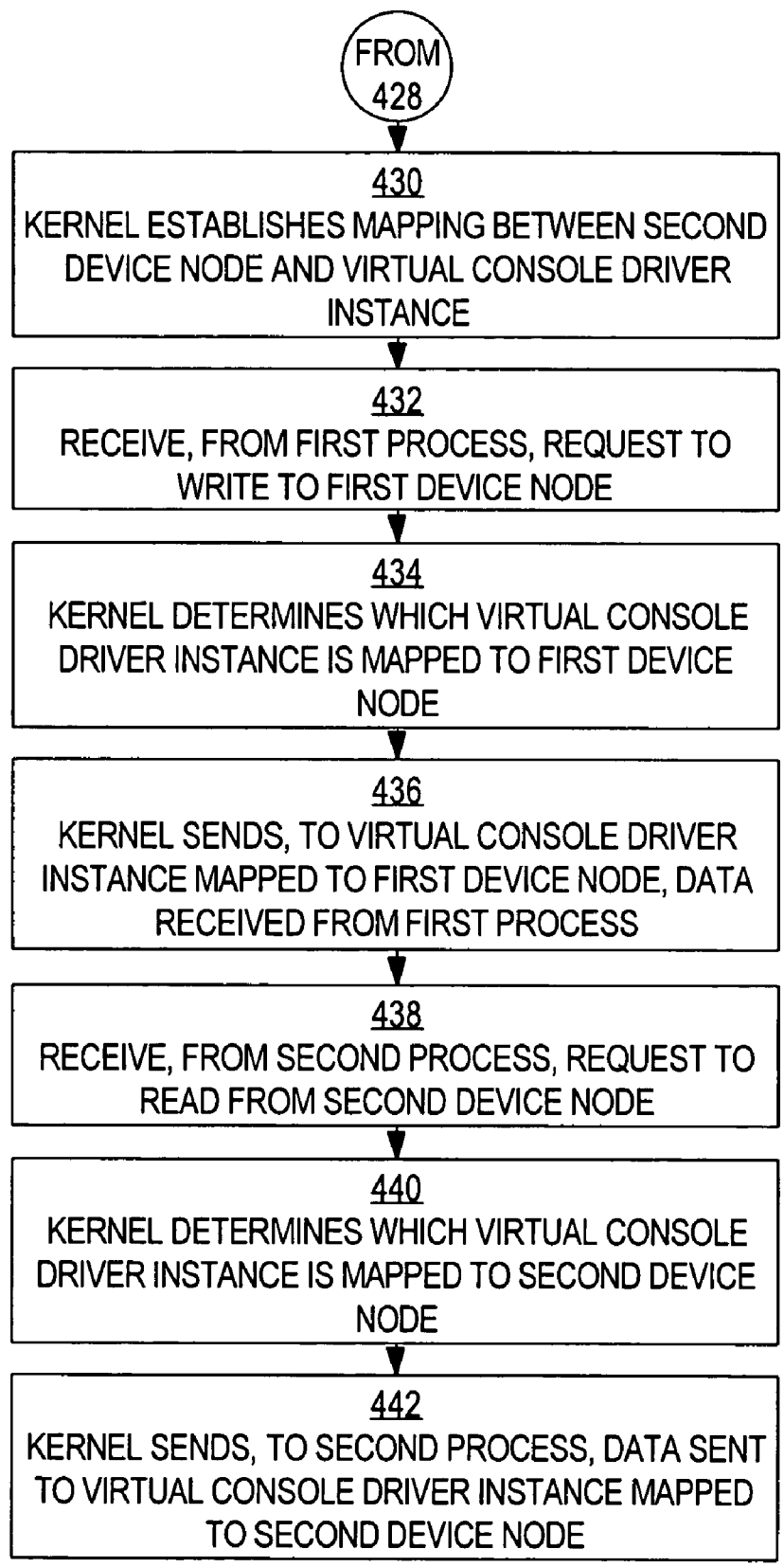

FIGS. 4A and 4B depict an operational flow for establishing a virtual system console in a non-global zone of an OS that has been partitioned into a global zone and one or more non-global zones, in accordance with one embodiment of the present invention. In block 402, a global zone is established under the control of an OS kernel instance. For example, global zone 130 may be established under the control of kernel 150. In block 404, one or more zoneadmd processes are executed within the global zone. For example, zoneadmd processes 162 may be executed within global zone 130.

In block 406, one or more non-global zones are established, within the global zone, under the control of the OS kernel instance. For example, non-global zones 140 may be established within global zone 130 under the control of kernel 150. Non-global zones 140 may be established through the interaction between corresponding zoneadmd processes 162 and kernel 150.

In block 408, a zoneadmd process corresponding to a particular non-global zone instructs the OS kernel instance to execute an instance of a virtual console driver that is implemented by the OS kernel instance. In block 410, in response to the zoneadmd process' instruction, the OS kernel instance executes an instance of the virtual console driver. The OS kernel instance identifies the instance to the zoneadmd process.

For example, zoneadmd process 162a may instruct kernel 150 to execute an instance of a virtual console driver. In response, kernel 150 may execute virtual console driver instance 306a. To zoneadmd process 162a, kernel 150 may identify virtual console driver instance 306a as having a major-minor number pair of "33,1".

For another example, zoneadmd process 162b may instruct kernel 150 to execute another instance of the same virtual console driver. In response, kernel 150 may execute virtual console driver instance 306b. To zoneadmd process 162b, kernel 150 may identify virtual console driver instance 306b as having a major-minor number pair of "33,2".

In block 412, the zoneadmd process instructs the OS kernel instance to generate a first device node in the particular non-global zone. In block 414, in response to the zoneadmd process' instruction, the OS kernel instance generates a first device node in the particular non-global zone. In block 416, the zoneadmd process instructs the OS kernel to establish a mapping between the first device node and a slave interface of the virtual console driver instance. In block 418, in response to the zoneadmd process' instruction, the OS kernel instance establishes a mapping between the first device node and a slave interface of the virtual console driver instance.

For example, zoneadmd process 162a may instruct kernel 150 to generate a device node in non-global zone 140a. In response, kernel 150 may generate device node 308a in non-global zone 140a. Zoneadmd process 162a may instruct kernel 150 to establish a mapping between device node 308a and a slave interface of the virtual console driver instance identified by major-minor number pair "33,1". In response, kernel 150 may establish a mapping between device node 308a and the slave interface of virtual console driver instance 306a.

For another example, zoneadmd process 162b may instruct kernel 150 to generate a device node in non-global zone 140b. In response, kernel 150 may generate device node 308b in non-global zone 140b. Zoneadmd process 162b may instruct kernel 150 to establish a mapping between device node 308b and a slave interface of the virtual console driver instance identified by major-minor number pair "33,2". In response, kernel 150 may establish a mapping between device node 308b and the slave interface of virtual console driver instance 306b.

In block 420, the zoneadmd process instructs the OS kernel instance to attach one or more STREAMS modules to the virtual console driver instance. In block 422, in response to the zoneadmd process' instruction, the OS kernel instance attaches one or more STREAMS modules to the virtual console driver interface. A terminal emulator module may be anchored to the virtual console driver interface so that the terminal emulator module cannot be deleted.

In block 424, the zoneadmd process instructs the OS kernel instance to generate a second device node in the global zone. In block 426, in response to the zoneadmd process' instruction, the OS kernel instance generates a second device node in the global zone. In block 428, the zoneadmd process instructs the OS kernel to establish a mapping between the second device node and a master interface of the virtual console driver instance. In block 430, in response to the zoneadmd process' instruction, the OS kernel instance establishes a mapping between the second device node and a master interface of the virtual console driver instance.

For example, zoneadmd process 162a may instruct kernel 150 to generate a device node in global zone 130. In response, kernel 150 may generate device node 304a in global zone 130. Zoneadmd process 162a may instruct kernel 150 to establish a mapping between device node 304a and a master interface of the virtual console driver instance identified by major-minor number pair "33,1". In response, kernel 150 may establish a mapping between device node 304a and the master interface of virtual console driver instance 306a.

For another example, zoneadmd process 162b may instruct kernel 150 to generate a device node in global zone 130. In response, kernel 150 may generate device node 304b in global zone 130. Zoneadmd process 162b may instruct kernel 150 to establish a mapping between device node 304b and a master interface of the virtual console driver instance identified by major-minor number pair "33,2". In response, kernel 150 may establish a mapping between device node 304*b* and the master interface of virtual console driver instance 306*b*.

In block 432, a request to write to the first device node is received from a first process executing in the particular non-global zone. In block 434, in response to the request, the OS kernel instance determines which instance of the virtual console driver is mapped to the first device node. In block 436, the OS kernel sends data received from the first process to the virtual console driver instance that is mapped to the first device node. The data may be passed through one or more STREAMS modules that are attached to the virtual console driver instance.

For example, one of processes 310*a* may write to device node 308*a*. In response, kernel 150 may determine which of virtual console driver instances 306 is mapped to device node 308*a*. Determining that device node 308*a* is mapped to virtual console driver instance 306*a*, kernel 150 may send, to virtual console driver instance 306*a*, the data that the process wrote to device node 308*a*.

For another example, one of processes 310*b* may write to device node 308*b*. In response, kernel 150 may determine which of virtual console driver instances 306 is mapped to device node 308*b*. Determining that device node 308*b* is mapped to virtual console driver instance 306*b*, kernel 150 may send, to virtual console driver instance 306*b*, the data that the process wrote to device node 308*b*.

In response to receiving data through its slave interface, the virtual console driver instance may make that data available through its master interface.

In block 438, a request to read from the second device node is received from a second process executing in the global zone. In block 440, in response to the request, the OS kernel instance determines which instance of the virtual console driver is mapped to the second device node. In block 442, the OS kernel sends, to the second process, data that has been received by the virtual console driver instance that is mapped to the second device node.

For example, zoneadmd process 162*a* may read from device node 304*a*. In response, kernel 150 may determine which of virtual console driver instances 306 is mapped to device node 304*a*. Determining that device node 304*a* is mapped to virtual console driver instance 306*a*, kernel 150 may send, to zoneadmd process 162*a*, data that processes 310*a* executing in non-global zone 140*a* wrote to device node 308*a*, and which kernel 150 sent to virtual console driver instance 306*a*. Zoneadmd process 162*a* may send this data to other processes executing in global zone 130, such as zone console login processes 302*a*.

For another example, zoneadmd process 162*b* may read from device node 304*b*. In response, kernel 150 may determine which of virtual console driver instances 306 is mapped to device node 304*b*. Determining that device node 304*b* is mapped to virtual console driver instance 306*b*, kernel 150 may send, to zoneadmd process 162*b*, data that processes 310*b* executing in non-global zone 140*b* wrote to device node 308*b*, and which kernel 150 sent to virtual console driver instance 306*b*. Zoneadmd process 162*b* may send this data to other processes executing in global zone 130, such as zone console login processes 302*b*.

Thus, each of non-global zones 140 may be associated with a separate virtual system console. Processes executing in a particular non-global zone may write data to and read data from the particular non-global zone's virtual system console. Processes executing in the global zone may write data to and read data from any non-global zone's virtual system console.

Hardware Overview

In one embodiment, the various components of OS 100 shown in FIG. 1 can be implemented as sets of instructions executable by one or more processors. These components may be implemented as part of an operating system, including but not limited to the Solaris™ operating system produced by Sun Microsystems, Inc.

FIG. 5 is a block diagram that illustrates a computer system 500 upon which an embodiment of the invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may also be a medium (e.g. air) that enables signals to be capacitively exchanged between one or more of the components. Bus 502 may further be a network connection that connects one or more of the components. Overall, any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. In this instance, the bus 502 would be the medium (such as air) that enables this capacitive communication to take place. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line. Appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:

executing a first instance of a virtual console driver that is implemented by an operating system kernel instance;

establishing a first device node within a first virtual operating system environment (VOSE) of a plurality of VOSEs controlled by the operating system kernel instance;

establishing an association between the first device node and the first instance of the virtual console driver;

in response to a first process' request to write to the first device node, determining with which instance of the virtual console driver the first device node is associated, wherein the first process executes in the first VOSE;

in response to determining that the first device node is associated with the first instance of the virtual console driver, sending, to the first instance of the virtual console driver, data received from the first process;

establishing a second device node within a global operating system environment (OSE) that comprises the plurality of VOSEs;

establishing an association between the second device node and the first instance of the virtual console driver;

in response to a second process' request to read from the second device node, determining with which instance of the virtual console driver the second device node is associated, wherein the second process executes in the global OSE; and in response to determining that the second device node is associated with the first instance of the virtual console driver, sending, to the second process, the data that was received from the first process and sent to the first instance of the virtual console driver.

2. The method of claim 1, wherein the second device node is not accessible by any processes executing in any VOSE of the plurality of VOSES.

3. The method of claim 1, further comprising:
receiving, from the second process, a command to execute an instance of the virtual console driver;
wherein the step of executing the first instance of the virtual console driver is performed in response to receiving the command from the second process.

4. The method of claim 1, further comprising:
receiving, from the second process, a command to establish the first device node within the first VOSE;
wherein the step of establishing the first device node within the first VOSE is performed in response to receiving the command from the second process.

5. The method of claim 1, further comprising:
executing a second instance of the virtual console driver, wherein the second instance of the virtual console driver is separate from the first instance of the virtual console driver;
establishing a third device node within a second virtual operating system environment (VOSE) of the plurality of VOSEs, wherein the second VOSE is separate from the first VOSE;
establishing an association between the third device node and the second instance of the virtual console driver;
in response to a second process' request to write to the third device node, determining with which instance of the virtual console driver the third device node is associated, wherein the second process executes in the second VOSE; and
in response to determining that the third device node is associated with the second instance of the virtual console driver, sending, to the second instance of the virtual console driver, data received from the second process.

6. The method of claim 5, wherein:
except for processes executing in the first VOSE, the first device node is not accessible by any processes executing in any VOSE of the plurality of VOSES; and
except for processes executing in the second VOSE, the third device node is not accessible by any processes executing in any VOSE of the plurality of VOSES.

7. The method of claim 5, wherein:
the first device node is exposed as "/dev/console" to processes executing in the first VOSE; and
the third device node is exposed as "/dev/console" to processes executing in the second VOSE.

8. The method of claim 1, wherein, except for processes executing in the first VOSE, the first device node is not accessible by any processes executing in any VOSE of the plurality of VOSEs.

9. The method of claim 1, wherein the first device node is exposed as "/dev/console" to processes executing in the first VOSE.

10. A machine-readable medium comprising:
instructions for causing one or more processors to execute a first instance of a virtual console driver that is implemented by an operating system kernel instance;
instructions for causing one or more processors to establish a first device node within a first virtual operating system environment (VOSE) of a plurality of VOSEs controlled by the operating system kernel instance;
instructions for causing one or more processors to establish an association between the first device node and the first instance of the virtual console driver;
instructions for causing one or more processors to determine, in response to a first process' request to write to the first device node, with which instance of the virtual console driver the first device node is associated, wherein the first process executes in the first VOSE;
instructions for causing one or more processors to send data received from the first process to the first instance of the virtual console driver in response to determining that the first device node is associated with the first instance of the virtual console driver;
instructions for causing one or more processors to establish a second device node within a global operating system environment (OSE) that comprises the plurality of VOSEs;
instructions for causing one or more processors to establish an association between the second device node and the first instance of the virtual console driver;
instructions for causing one or more processors to determine, in response to a second process' request to read from the second device node, with which instance of the virtual console driver the second device node is associated, wherein the second process executes in the global OSE; and
instructions for causing one or more processors to send, to the second process, in response to determining that the second device node is associated with the first instance of the virtual console driver, the data that was received from the first process and sent to the first instance of the virtual console driver.

11. The machine-readable medium of claim 10, wherein the second device node is not accessible by any processes executing in any VOSE of the plurality of VOSES.

12. The machine-readable medium of claim 10, further comprising:
instructions for causing one or more processors to receive, from the second process, a command to execute an instance of the virtual console driver;
wherein the instructions for causing one or more processors to execute the first instance of the virtual console driver comprise instructions for causing one or more processors to execute the first instance of the virtual console driver in response to receiving the command from the second process.

13. The machine-readable medium of claim 10, further comprising:
instructions for causing one or more processors to receive, from the second process, a command to establish the first device node within the first VOSE;
wherein the instructions for causing one or more processors to establish the first device node within the first VOSE comprise instructions for causing one or more processors to establish the first device node within the first VOSE in response to receiving the command from the second process.

14. The machine-readable medium of claim 10, further comprising:
instructions for causing one or more processors to execute a second instance of the virtual console driver, wherein the second instance of the virtual console driver is separate from the first instance of the virtual console driver;

instructions for causing one or more processors to establish a third device node within a second virtual operating system environment (VOSE) of the plurality of VOSEs, wherein the second VOSE is separate from the first VOSE;

instructions for causing one or more processors to establish an association between the third device node and the second instance of the virtual console driver;

instructions for causing one or more processors to determine, in response to a second process' request to write to the third device node, with which instance of the virtual console driver the third device node is associated, wherein the second process executes in the second VOSE; and instructions for causing one or more processors to send data received from the second process to the second instance of the virtual console driver in response to determining that the third device node is associated with the second instance of the virtual console driver.

15. The machine-readable medium of claim 14, wherein:

except for processes executing in the first VOSE, the first device node is not accessible by any processes executing in any VOSE of the plurality of VOSEs; and except for processes executing in the second VOSE, the third device node is not accessible by any processes executing in any VOSE of the plurality of VOSEs.

16. The machine-readable medium of claim 14, wherein:

the first device node is exposed as "/dev/console" to processes executing in the first VOSE; and the third device node is exposed as "/dev/console" to processes executing in the second VOSE.

17. The machine-readable medium of claim 10, wherein, except for processes executing in the first VOSE, the first device node is not accessible by any processes executing in any VOSE of the plurality of VOSEs.

18. The machine-readable medium of claim 10, wherein the first device node is exposed as "/dev/console" to processes executing in the first VOSE.

19. An apparatus comprising:

a mechanism for executing a first instance of a virtual console driver that is implemented by an operating system kernel instance;

a mechanism for establishing a first device node within a first virtual operating system environment (VOSE) of a plurality of VOSEs controlled by the operating system kernel instance;

a mechanism for establishing an association between the first device node and the first instance of the virtual console driver;

a mechanism for determining, in response to a first process' request to write to the first device node, with which instance of the virtual console driver the first device node is associated, wherein the first process executes in the first VOSE;

a mechanism for sending data received from the first process to the first instance of the virtual console driver in response to determining that the first device node is associated with the first instance of the virtual console driver;

a mechanism for establishing a second device node within a global operating system environment (OSE) that comprises the plurality of VOSEs;

a mechanism for establishing an association between the second device node and the first instance of the virtual console driver;

a mechanism for determining, in response to a second process' request to read from the second device node, with which instance of the virtual console driver the second device node is associated, wherein the second process executes in the global OSE; and a mechanism for sending the data that was received from the first process and sent to the first instance of the virtual console driver to the second process in response to determining that the second device node is associated with the first instance of the virtual console driver.

20. The apparatus of claim 19, wherein the second device node is not accessible by any processes executing in any VOSE of the plurality of VOSES.

21. The apparatus of claim 19, further comprising:

a mechanism for receiving, from the second process, a command to execute an instance of the virtual console driver;

wherein the mechanism for executing the first instance of the virtual console driver comprises a mechanism for executing the first instance of the virtual console driver in response to receiving the command from the second process.

22. The apparatus of claim 19, further comprising:

a mechanism for receiving, from the second process, a command to establish the first device node within the first VOSE;

wherein the mechanism for establishing the first device node within the first VOSE comprises a mechanism for establishing the first device node within the first VOSE in response to receiving the command from the second process.

23. The apparatus of claim 19, further comprising:

a mechanism for executing a second instance of the virtual console driver, wherein the second instance of the virtual console driver is separate from the first instance of the virtual console driver;

a mechanism for establishing a third device node within a second virtual operating system environment (VOSE) of the plurality of VOSEs, wherein the second VOSE is separate from the first VOSE;

a mechanism for establishing an association between the third device node and the second instance of the virtual console driver;

a mechanism for determining, in response to a second process' request to write to the third device node, with which instance of the virtual console driver the third device node is associated, wherein the second process executes in the second VOSE; and a mechanism for sending data received from the second process to the second instance of the virtual console driver in response to determining that the third device node is associated with the second instance of the virtual console driver.

24. The apparatus of claim 23, wherein:

except for processes executing in the first VOSE, the first device node is not accessible by any processes executing in any VOSE of the plurality of VOSES; and except for processes executing in the second VOSE, the third device node is not accessible by any processes executing in any VOSE of the plurality of VOSES.

25. The apparatus of claim 23, wherein:

the first device node is exposed as "/dev/console" to processes executing in the first VOSE; and the third device node is exposed as "/dev/console" to processes executing in the second VOSE.

26. The apparatus of claim 19, wherein, except for processes executing in the first VOSE, the first device node is not accessible by any processes executing in any VOSE of the plurality of VOSES.

27. The apparatus of claim 19, wherein the first device node is exposed as "/dev/console" to processes executing in the first VOSE.

* * * * *